United States Patent [19]
Sato

[11] Patent Number: 5,406,423
[45] Date of Patent: Apr. 11, 1995

[54] APPARATUS AND METHOD FOR RETRIEVING AUDIO SIGNALS FROM A RECORDING MEDIUM

[75] Inventor: Koichi Sato, Tokyo, Japan

[73] Assignee: Asahi Kogaku Kogyo Kabushiki Kaisha, Tokyo, Japan

[21] Appl. No.: 180,819

[22] Filed: Jan. 10, 1994

Related U.S. Application Data

[63] Continuation of Ser. No. 765,064, Sep. 24, 1991, abandoned.

[30] Foreign Application Priority Data

Oct. 1, 1990 [JP] Japan .................................. 2-264284
Oct. 1, 1990 [JP] Japan .................................. 2-264285

[51] Int. Cl.$^6$ ............................................. G11B 5/02
[52] U.S. Cl. ................................. 360/27; 360/8; 360/10.1
[58] Field of Search .............. 360/27, 8, 35.1, 19.1, 360/60, 9.1, 10.1; 358/906, 341, 342, 909

[56] References Cited

U.S. PATENT DOCUMENTS

| | | | |
|---|---|---|---|
| 4,771,345 | 9/1988 | Watanabe | 360/8 |
| 4,816,928 | 3/1989 | Sasaki et al. | 360/35.1 |
| 4,943,872 | 7/1990 | Yamazaki | 360/8 |
| 5,047,869 | 9/1991 | Aoki et al. | 360/9.1 |
| 5,166,804 | 11/1992 | Takahashi | 360/10.1 |
| 5,239,430 | 8/1993 | Koishikawa et al. | 360/8 |
| 5,301,070 | 4/1994 | Tanaka | 360/10.1 |

FOREIGN PATENT DOCUMENTS

| | | |
|---|---|---|
| 0180477 | 5/1986 | European Pat. Off. . |
| 0196216 | 10/1986 | European Pat. Off. . |
| 0379445 | 7/1990 | European Pat. Off. . |
| 3934631 | 6/1990 | Germany . |
| 1269292 | 10/1989 | Japan . |
| 298852 | 4/1990 | Japan . |
| 2158283 | 11/1985 | United Kingdom . |

OTHER PUBLICATIONS

Patent Abstracts of Japan 2-98852, publication date Apr. 11, 1990.
Copy of English Language Translation of German Office Action of Mar. 10, 1993.
English Language Abstract of Japanese Patents 1-269292.
Translation of the German Office Action dated Dec. 22, 1993.

*Primary Examiner*—Georgia Y. Epps
*Assistant Examiner*—Tan Dinh
*Attorney, Agent, or Firm*—Sandler, Greenblum & Bernstein

[57] ABSTRACT

A retrieval device and method for retrieving audio signals recorded on a floppy disk, in which the audio signals are reproduced by an amount needed to recognize the content of the audio signals to obtain a heading of the audio signals. A track of the floppy disk is divided into sectors. The audio signals are recorded in various sectors, and the head of the audio signals are recorded in one of the sectors. The audio signals are reproduced from the head, and can be reproduced within a predetermined time, regardless of a compression ratio compression ratio that is used, and the audio signals may be that is used with the audio signals. The amount of the reproduced audio signals may be changed in accordance with the reproduced at a high speed.

8 Claims, 10 Drawing Sheets

APPARATUS AND METHOD FOR RETRIEVING AUDIO SIGNALS FROM A RECORDING MEDIUM

This application is a continuation of application Ser. No. 07/765,054, filed Sep. 24, 1991, now abandoned.

BACKGROUND OF THE INVENTION

1. Field of the Invention

The present invention relates to a retrieval device and method of retrieving audio signals recorded on a video floppy disk that is used as a recording medium for an electronic still video camera, etc.

2. Description of the Related Art

In such a video floppy disk, each of the tracks in which audio signals are recorded is usually divided into four sectors. The heading of the audio signals is executed, as disclosed in Japanese Unexamined Patent Publication No. HEI 1-269292, by demodulating audio signals recorded in the sector at the top of each track and sequentially outputting these signals as a voice.

Audio signals can be recorded and reproduced, respectively, in modes of about 5 seconds, about 10 seconds and about 20 seconds per track, respectively, according to the use of a compression ratio. As described above, as one track consists of four sectors, the recording and reproducing time per sector in each mode is about 1.2 seconds, about 2.5 seconds, and about 5 seconds, respectively.

However, when voices are recorded in, for example, the mode of about 5 seconds per track, the reproducing time is about 1.2 seconds, which is very short. Therefore, it is difficult to recognize the reproduced voices and a problem arises in that it becomes difficult to retrieve an appointed track. Conversely, if all of the audio signals are reproduced, it takes a lot of time, and the efficiency of the retrieval is worsened.

SUMMARY OF THE INVENTION

Therefore, an object of the present invention is to provide a retrieval device, and method of retrieving audio signals, by which a retrieval of a required track is easily carried out without fail regardless of a mode in which voices are recorded.

Another object of the present invention is to provide a retrieval device, and method of retrieving audio signals, by which the retrieval of a required track is carried out in a short time regardless of the amount of audio signals.

According to the present invention, there is provided a device for retrieving audio signals, which comprises an audio signal detecting mechanism, a head detecting mechanism, and a reproducing mechanism. The audio signal detecting mechanism detects audio signals recorded on a recording medium. The head detecting mechanism detects the head of a series of audio signals detected by the audio signal detecting mechanism. The reproducing mechanism reproduces the audio signals from the head detected by the head detecting mechanism, the amount of reproduced audio signals being sufficient to enable a recognition of the contents of the audio signals.

Further, according to the present invention, there is provided a method of retrieving audio signals, comprising a first step of detecting audio signals recorded on a recording medium, a second step of detecting the head of a series of the audio signals detected by the first step, and a third step of reproducing the audio signals from the head detected by the second step, the amount of reproduced audio signals being sufficient to enable a recognition of the contents of the audio signals.

Furthermore, according to the present invention, there is provided a device for retrieving audio signals, which comprises an audio signal detecting mechanism, a head detecting mechanism, and a reproducing mechanism. The audio signal detecting mechanism detects audio signals recorded in a recording medium. The head detecting mechanism detects the head of a series of the audio signals, and the reproducing mechanism reproduces the audio signals within a predetermined time from the head thereof, regardless of the compression of the audio signals.

Still further, according to the present invention, there is provided a device for retrieving audio signals, which comprises an audio signal detecting mechanism, a head detecting mechanism, a ratio detecting mechanism, and a reproducing mechanism. The audio signal detecting mechanism detects audio signals recorded in a recording medium. The head detecting mechanism detects the head of a series of the audio signals. The ratio detecting mechanism detects the compression ratio of the audio signals, and the reproducing mechanism reproduces the audio signals from the head thereof only by an amount in accordance with the compression ratio of the audio signal.

Further, according to the present invention, there is provided a method of retrieving audio signals recorded on a recording medium through a heading of a series of the audio signals, by reproducing the audio signals at a predetermined compression ratio. The method is characterized in that a reproduction required for the heading is made in a predetermined time regardless of the compression ratio.

Furthermore, according to the present invention, there is provided a method characterized in that the amount of reproduction required for the heading is varied in accordance with the compression ratio.

Further, according to the present invention, there is provided a device for retrieving audio signals, which comprises an audio signal detecting mechanism, a head detecting mechanism, and a reproducing mechanism. The audio signal detecting mechanism detects audio signals recorded in a recording medium. The head detecting mechanism detects the head of a series of audio signals, and the reproducing mechanism reproduces audio signals, starting from the head thereof, with a smaller expansion ratio than an expansion ratio used in a usual reproduction.

Furthermore, according to the present invention, there is provided a device for retrieving audio signals, which comprises an audio signal detecting mechanism, a head detecting mechanism, and a reproducing mechanism. The audio signal detecting mechanism detects audio signals recorded on a recording medium. The head detecting mechanism detects the head of a series of the audio signals and the reproducing mechanism reproduces the audio signals, starting from the head thereof, at a predetermined expansion ratio, and then reproduces the audio signals at a second expansion ratio that is smaller than the predetermined expansion ratio.

Further, according to the present invention, there is provided a method of retrieving audio signals recorded on a recording medium, by expanding and reproducing the audio signals at a predetermined compression ratio through a heading of a series of the audio signals, the method being characterized in that the expansion ratio is smaller than an expansion ratio used in a usual reproduction.

Furthermore, according to the present invention, there is provided a method characterized in that, after having reproduced the audio signals at a predetermined expansion ratio, the audio signals are reproduced at a second expansion ratio that is smaller than the predetermined expansion ratio.

Further, according to the present invention, there is provided a device for retrieving audio signals, which comprises a detecting mechanism and a reproducing mechanism. The detecting mechanism detects audio signals recorded on a recording medium, and the reproducing mechanism reproduces the audio signals detected by the detecting mechanism, the amount of reproduced audio signals being sufficient to enable a recognition of the contents of the audio signals.

Furthermore, according to the present invention, there is provided a device for retrieving audio signals, which comprises an audio signal detecting mechanism, a head detecting mechanism, and a reproducing mechanism. The audio signal detecting mechanism detects audio signals recorded in a recording medium. The head detecting mechanism detects the head of a series of audio signals detected by the audio signal detecting mechanism, and the reproducing mechanism reproduces audio signals subsequent to the head detected by the head detecting mechanism. Accordingly, the amount of reproduced audio signals is sufficient to surmise the contents of the whole of the audio signals detected by the audio signal detecting mechanism.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
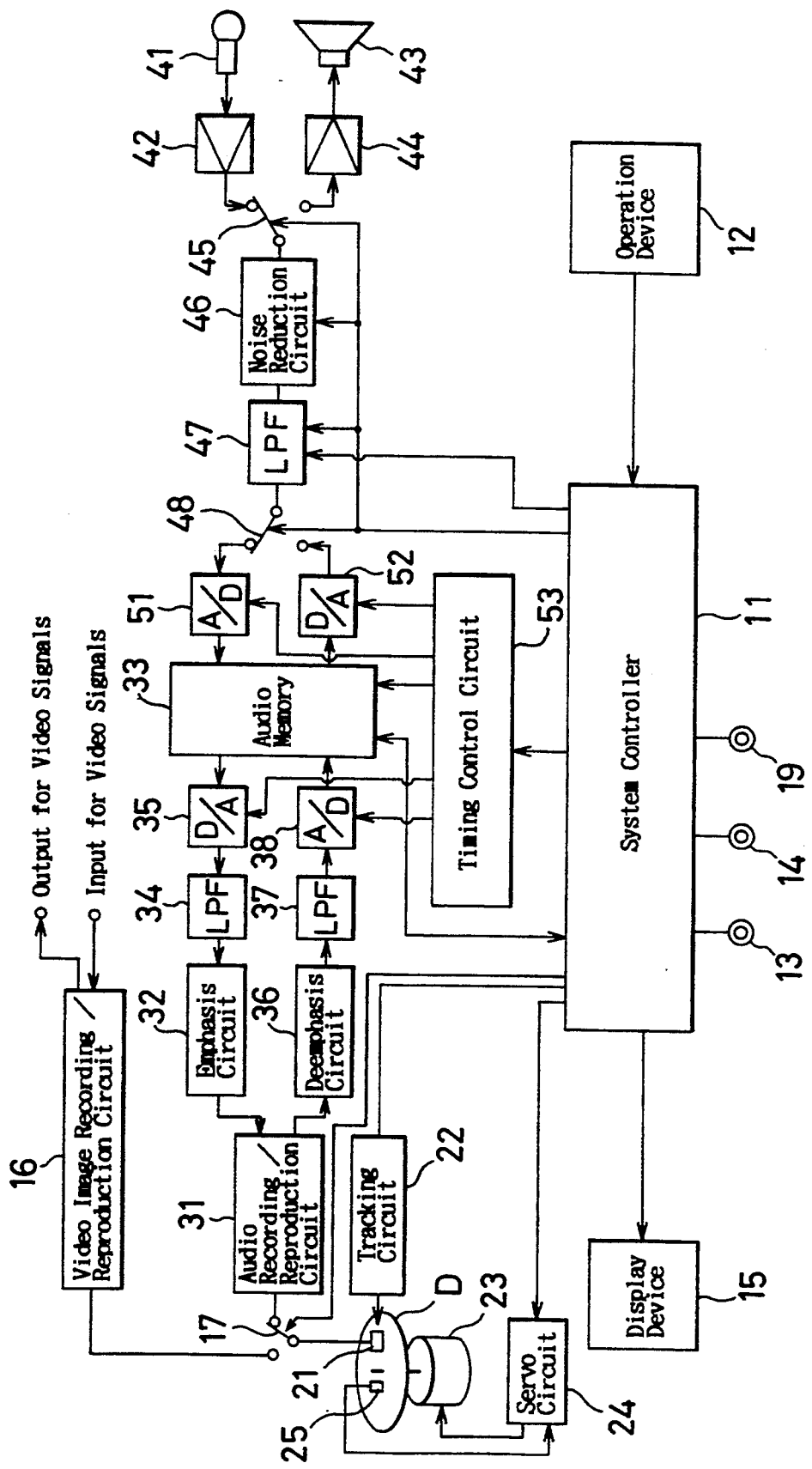
FIG. 1 is a circuit diagram of a disk recording/reproduction device to which a retrieval device and method of retrieving audio signals of an embodiment of the invention is applied.

The present invention will now be described with reference to the embodiments shown in the drawings.

FIG. 1 is a circuit diagram of a disk recording/reproduction device to which a retrieval device and method of retrieving audio signals of an embodiment of the present invention is applied. A system controller 11 is a well-known microcomputer which controls the whole device. An operating device 12 for carrying out various operations, an audio retrieval button 13, a stop button 14, and a high speed reproduction button 19, etc., are connected to the system controller 11. A display device 15 for displaying various state indications is also connected to the system controller 11.

A disk drive unit is provided with a magnetic head 21, a tracking circuit 22 for controlling the magnetic head 21, a spindle motor 23 for rotating a video floppy disk D, a servo circuit 24 for driving and controlling the motor 23, and a PG coil 25 for sensing a rotational timing of the video floppy disk D. The PG coil 25 are connected to the servo circuit 24, and the servo circuit 24 and the tracking circuit 22 are connected to the system controller 11, which controls the magnetic disk D to rotate at approximately 3600 rpm.

A video image recording/reproduction circuit 16, controlled by the system controller 11, separates video signals inputted by a video camera, etc. (not shown) into color difference signals, and luminance signals, and frequency-modulates and records the same on the video floppy disk D through a switch 17. The video image recording/reproduction circuit 16 is also connected to a video output terminal (not labelled). Therefore, by connecting a reproduction device (not shown) to this terminal, it is possible to view the video images recorded on the video floppy disk D. The switch 17 is controlled by the system controller 11 to be closed at the video recording/reproduction circuit 16 side when recording and reproducing video images, and to be closed at the audio recording/reproducing circuit 31 side to be described later, when recording and reproducing voices.

A circuit for recording and reproducing voices is described below.

The audio recording/reproduction circuit 31 carries out a frequency-modulation and frequency-demodulation of signals, and is connected to the magnetic head 21 through switch 17. An emphasis circuit 32 emphasizes a high frequency component of the audio signals transmitted from an audio memory 33 when recording voices on the disk D, and outputs the same to the audio recording/reproduction circuit 31. The emphasis circuit 32 is connected to the audio memory 33 through a low-pass filter 34 and a D/A converter 35. A deemphasis circuit 36 suppresses high frequency components of audio signals outputted from the audio recording/reproduction circuit 31, when reproducing voices recorded in the disk D, and is connected to the audio memory 33 through a low-pass filter 37 and an A/D converter 38.

A microphone 41 is connected to a switch 45 through an amplifier 42, while a speaker 43 is connected to the switch 45 through another amplifier 44. The switch 45 is controlled by the system controller 11, to be closed at the microphone amplifier 42 side when recording voices, and to be closed at the speaker amplifier 44 side when reproducing voices. The switch 45 is connected to a noise reduction circuit 46 that is connected to a low-pass filter 47, which in turn is connected to an A/D converter 51 and a D/A converter 52 through a switch 48. The A/D converter 51 and the D/A converter 52 are connected to the audio memory 33. Switch 48 is controlled by the system controller 11 to be closed at the A/D converter 51 side when recording voices, and to be closed at the D/A converter 52 side when reproducing the voices. The noise reduction circuit 46 and the low-pass filter 47 are also controlled by the system controller 11.

A timing control circuit 53 is connected to the audio memory 33, the A/D converters 51, 38 and the D/A converters 52, 35. The timing control circuit 53 is controlled by the system controller 11 to compress and expand audio signals in the time axis, in association with the audio memory 33, the A/D converters 51, 38 and the D/A converters 52, 35 when recording and reproducing voices on the disk D.

When recording voices, the voices inputted through the microphone 41 pass through amplifier 42, the noise reduction circuit 46, and the low-pass filter 47, and are inputted to the A/D converter 51. The audio signals are then time-compressed by an operation of the A/D converter 51, the audio memory 33 and the timing control circuit 53, and digital-analog converted by the D/A converter 35, to be passed through the low-pass filter 34. The high frequency component thereof is emphasized by the emphasis circuit 32. Then, the audio signals are frequency-modulated by the audio recording/reproduction circuit 31 and recorded onto the disk D.

When reproducing voices, the audio signals recorded on the disk D are frequency-modulated by the audio recording/reproduction circuit 31. The high frequency component of the audio signals is then suppressed by the deemphasis circuit 36. Thereafter, the audio signals are passed through the low-pass filter 37 and the A/D converter 38, and stored in the audio memory 33. The audio signals memorized in the audio memory 33 are time-expanded by an operation of the audio memory 33, the timing control circuit 53 and the D/A converter 52. At the same time, they are outputted as analog signals and passed through the low-pass filter 47, the noise reduction circuit 46 and the amplifier 44, and reproduced by the speaker 43.

The audio signals are time-compressed to be recorded on the magnetic disk D rotating at approximately 3600 rpm, and when reproducing voices, the audio signals are time-expanded with an expansion ratio corresponding to the compression ratio.

Figure 2:
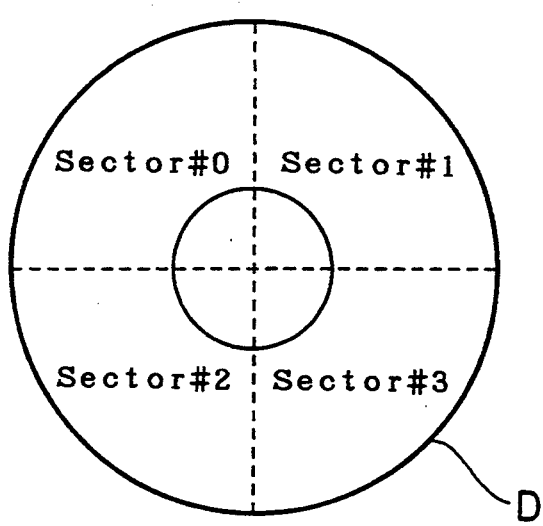
FIG. 2 is a view showing a video floppy disk.

FIG. 2 shows the video floppy disk D used in the disk recording/reproduction device shown in FIG. 1. The video floppy disk D is, for example, a 2-inch type magnetic disk. A first through fiftieth tracks from the outside of the video floppy disk D are recording tracks in which video images and voices, etc., are recorded. Nothing is recorded on a fifty-first track, and a fifty-second track is a queue track in which queue signals are recorded. Note, a track in which audio signals are recorded is divided into four sectors.

Figure 3:
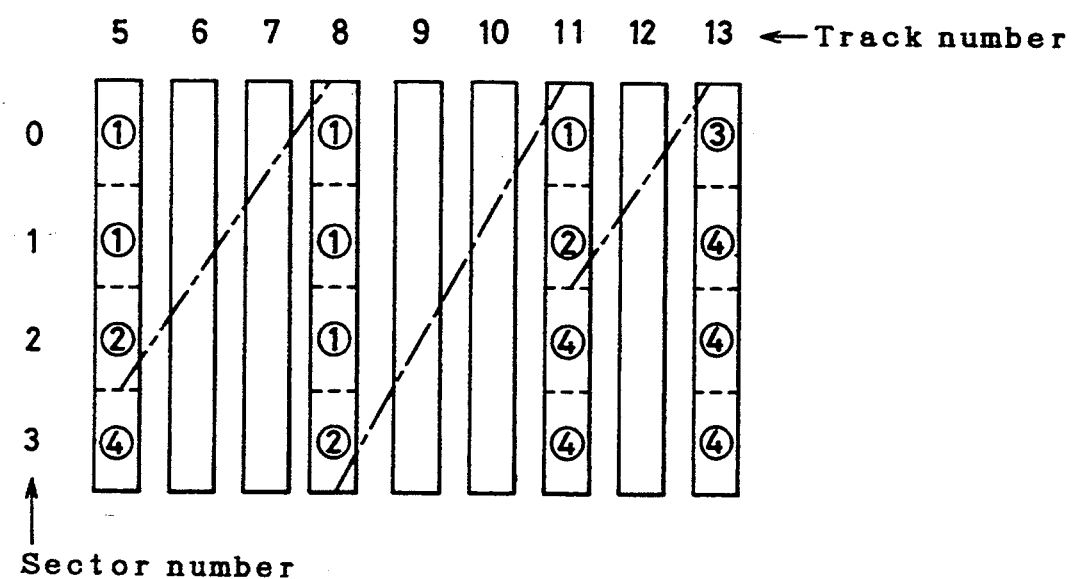
FIG. 3 is a view showing a relationship between a track and sectors of the video floppy disk of FIG. 2.

FIG. 3 shows a relationship between the tracks and sectors of the video floppy disk D. In the example shown in FIG. 3, video image signals are recorded on the sixth, seventh, ninth, tenth and twelfth tracks, respectively, and the audio signals are recorded on the fifth, eighth, eleventh and thirteenth tracks, respectively. Video image signals are recorded with a track as one unit, but the track in which audio signals are recorded is divided into four sectors and the audio signals are recorded with a sector as one unit. As described later, a series of audio signals can be formed by linking various sectors to one another.

Four types of recording patterns of the signals in the sectors in which audio signals are recorded exist, i.e., Type 1 (indicated by the symbol ① in FIG. 3) is a sector which as a subsequent sector in which audio signals are recorded; Type 2 (indicated by the symbol ② in FIG. 3) is a sector which includes audio signals followed by the other audio signals recorded in the other sector; Type 3 (indicated by the symbol ③ in FIG. 3) is a sector in which a series of audio signals end; and Type 4 (indicated by the symbol ④ in FIG. 3) is a sector in which no audio signal is recorded. Namely, in the example shown in FIG. 3, audio signals are continued from sector #2 of the fifth track to the eighth track, continued from sector #3 of the eighth track to the eleventh track, and continued from sector #1 of the eleventh track to sector #0 of the thirteenth track, at which the signals end. Namely, a series of the audio signals is recorded across predetermined tracks of the fifth, the eighth, the eleventh, and the thirteenth tracks, respectively.

Figure 4:
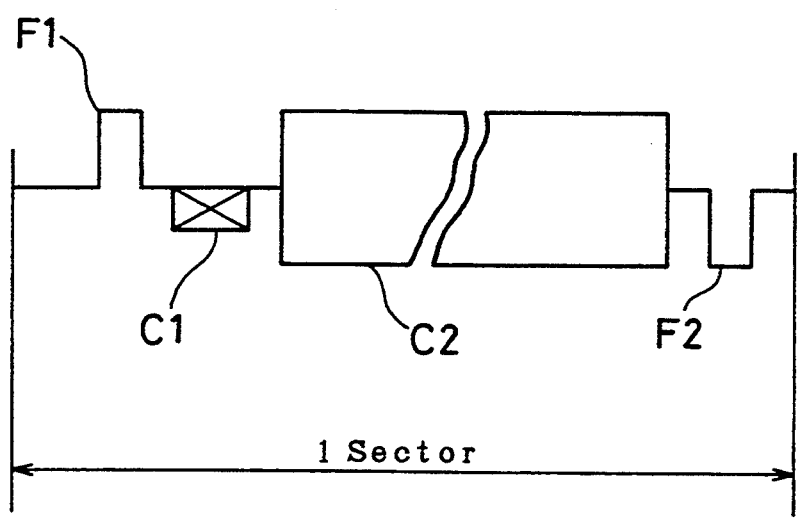
FIG. 4 is a schematic view showing a recording state of an audio signal.

FIG. 4 schematically shows a recording state of a signal in one sector in which audio signals are recorded. As shown in the drawing, a signal starting from a start flag F1 and ending at an end flag F2 is recorded in each of the sectors. A control code C1 for recording various data is recorded immediately after the start flag F1. Audio wave signals C2 are recorded between the control code C1 and the end flag F2.

In the Type 1 recording pattern of the signals shown in FIG. 4, the start flag F1 is a high level signal and the end flag F2 is a low level signal. Although in the Type 2 pattern, the start flag F1 is also a high level signal and the end flag F2 is a low level signal, a sector following the sector of the Type 2 pattern is not a Type 3 pattern in the same track. In the Type 3 pattern, both the start flag F1 and the end flag F2 are a low level signal. In the Type 4 pattern, the start flag F1 is a low level signal and the end flag 2 is a high level signal.

Figure 5:
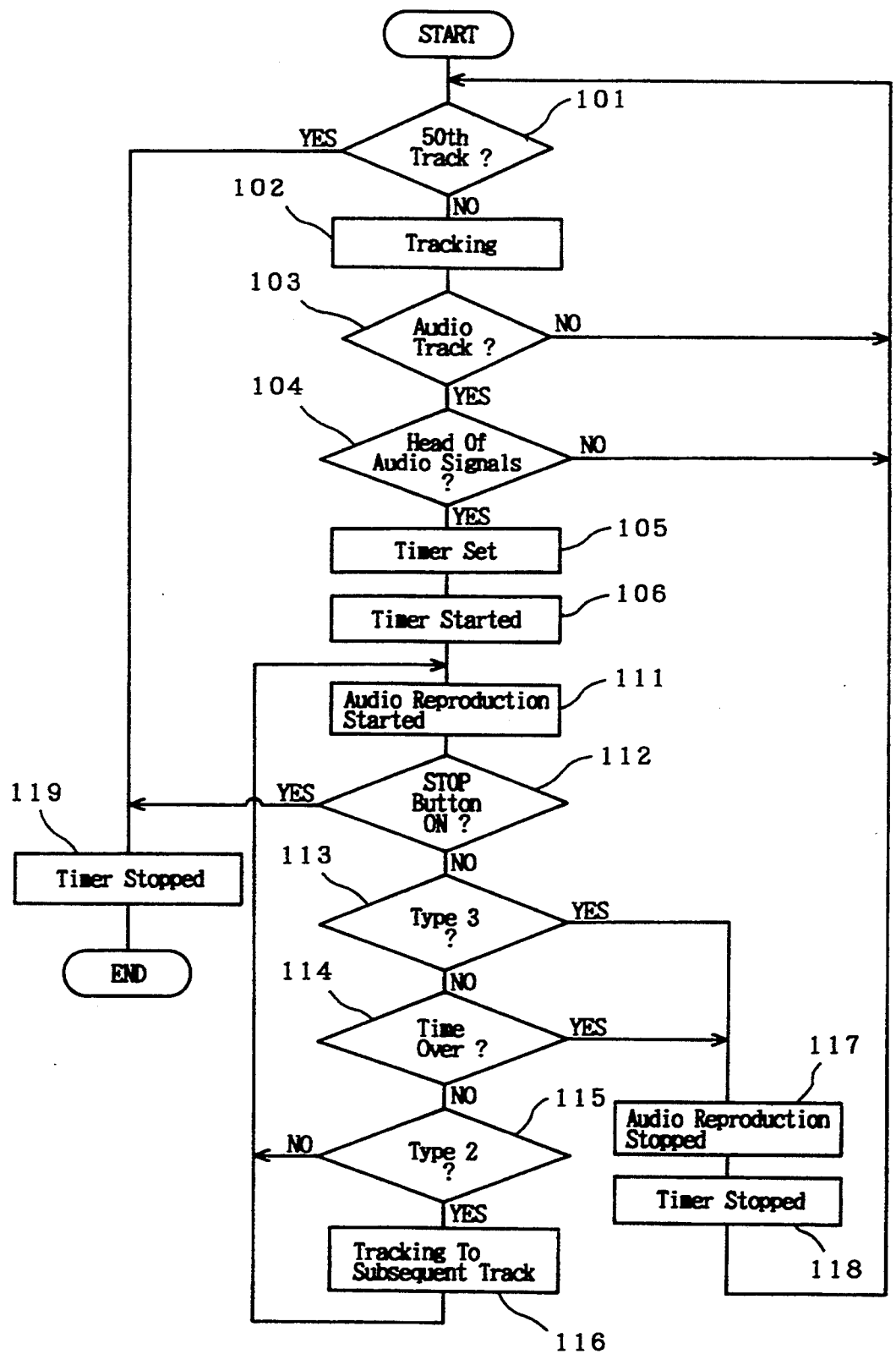
FIG. 5 is a flow chart showing a first method of retrieving audio signals.

FIG. 5 is a flow chart showing a first method of carrying out a retrieval of audio signals. This routine is started by pressing the audio retrieval button 13 shown in FIG. 1.

In step 101 of FIG. 5, it is determined whether the magnetic head 21 currently faces the fiftieth track of the video floppy disk D, i.e., the innermost track of the recording tracks. The video floppy disk D is read from the outer circumferential side to the inner circumferential side of the video floppy disk D. When the magnetic head 21 is located at the fiftieth track, since the reading of the recording tracks is completed, a timer (not shown) is stopped in step 119 and the process is ended.

When a reproduction of the fiftieth track has not been executed, a tracking operation is carried out in step 102, whereby the magnetic head 21 is moved inward by one track. Then, in step 103, it is determined whether the track about to be reproduced is a track in which audio signals are recorded. This is determined based on the number of an output signal received from a synchronous signal separation circuit (not shown). The synchronous signal separation circuit senses the start flag F1 and the end flag F2 as a vertical synchronous signal. Thus, if audio signals are stored in the track reproduced at present, the number of the synchronous signals are larger than that of a track in which image signals are recorded.

When audio signals are not recorded in the track, the process returns to step 101. Conversely, when audio signals are recorded in the track, in step 104, it is determined by reading control code C1 (FIG. 4) whether this sector is the head of a series of audio signals. Namely, the track number and the sector number of a top sector are recorded in the control code C1 in each sector of a series of audio signals. By reading these numbers, it is determined whether the sector is the head of a series of audio signals. When the track now being reproduced is not the head of a series of audio signals, the process returns to step 101. When the track is the beginning of a series of the audio signals, step 105 and the following steps are executed.

In a step 105, a time limit is set in the timer. In step 106, the timer is started.

Then, in step 111, a reproduction of audio signals is started. In step 112, it is determined whether the stop button 14 (FIG. 1) has been depressed. When the stop button 14 has been depressed, the timer is stopped in step 119 and the process is forcibly ended under this condition. Conversely, when the stop button 14 has not been depressed, step 113 is executed. Namely, in the step 113, it is determined whether the sector now being reproduced is the Type 3 pattern, i.e., the sector is the end of a series of audio signals. If the sector is not the Type 3 pattern, the timer started in step 106 is checked in step 114 to determine whether the time is up. Namely, it is determined whether the time limit set in step 105 has passed. If the time limit has not been passed, it is determined in step 115 whether the sector now being reproduced is the Type 2 pattern, i.e., the audio signals are followed by a sector of the other track. If it is not the Type 2 pattern, the process is returned directly to step 111. If the sector is the Type 2 pattern, the magnetic head is traversed to the subsequent track, in step 116, and the process then returns to step 111.

Steps 111 through 116 are repeatedly executed. Thus, the audio signals are reproduced in some sectors. Thereafter, when it is determined in step 113 that the sector now being reproduced is the Type 3 pattern, or when it is determined in step 114 that a predetermined time has passed, the reproduction of the audio signals is stopped in step 117. At the same time, the timer is stopped in step 118. The process then returns to step 101. Thus, the process as described above is repeatedly executed, whereby the next series of audio signals are reproduced, i.e., a heading of the next series of audio signals is carried out.

As described above, in the first method, audio signals are reproduced within a predetermined time regardless of the compression ratio of the recording of the audio signals. Accordingly, even though it is a mode in which voices are recorded for about 5 seconds per track, the reproduction time of, for example, about 2.5 seconds is obtained. (In this embodiment, the predetermined time is set to 2.5 seconds.) Therefore, the reproduction time is sufficient to enable a recognition of the contents of the voices, and it is thus easier to retrieve an appointed track. Furthermore, according to the first method, even though audio signals having different recording modes are mixed and exist in one video floppy disk, an appointed track can be accurately retrieved because the audio signals can be reproduced within a fixed time period.

Figure 6:
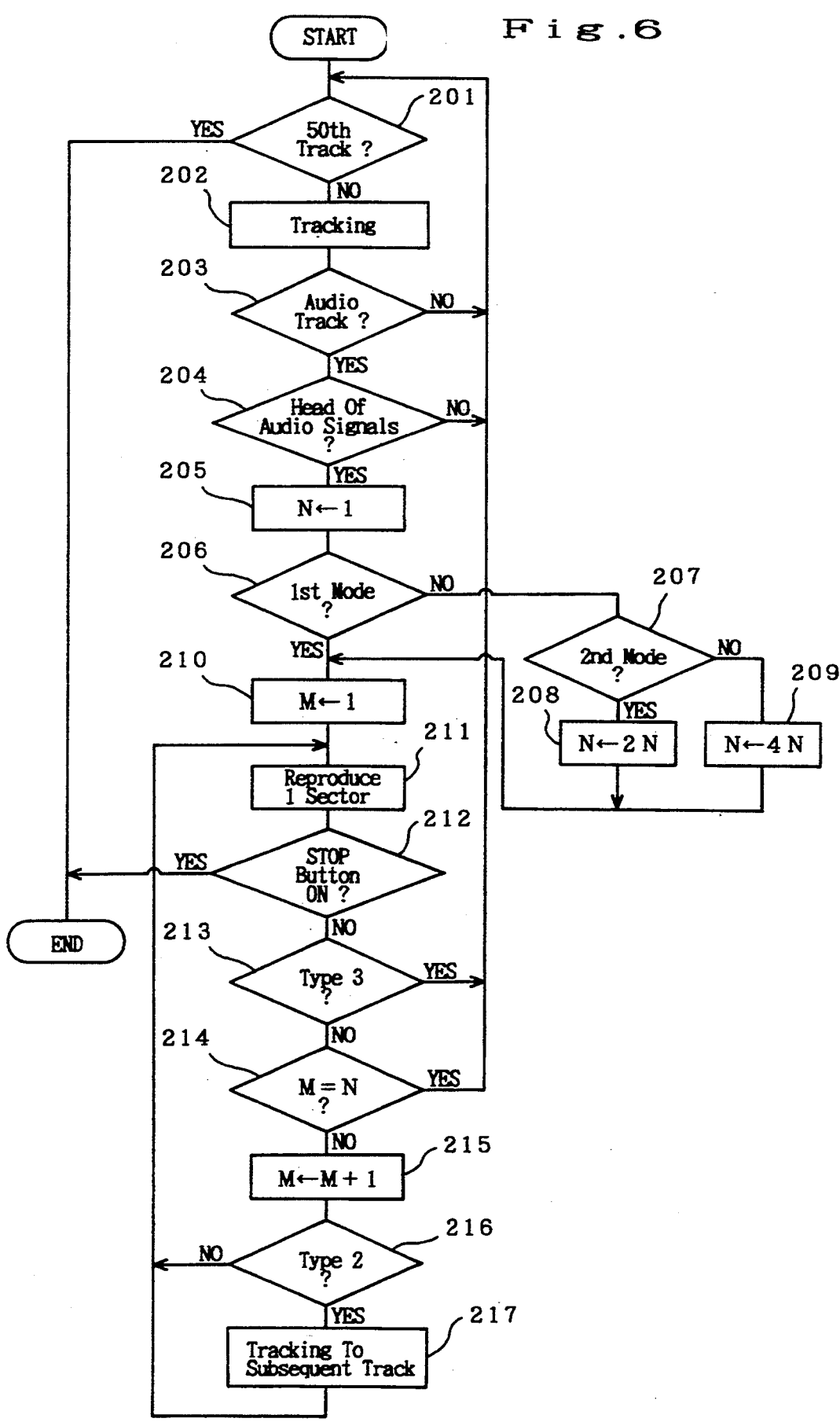
FIG. 6 is a flow chart showing a second method of retrieving audio signals.

FIG. 6 is a flow chart showing a second method of carrying out a retrieval of audio signals. This routine is started by depressing the voice retrieval button 13 (FIG. 1).

Since the operations in steps 201, 202, 203 and 204 of FIG. 6 are the same as those in steps 101, 102, 103 and 104 of FIG. 5, a description thereof is omitted.

In step 205, a reference value N, showing the number sectors to be reproduced, is set to "1". Note, this is only an example, and the reference number N can be set to "2" or a larger number if necessary. In step 206, it is determined whether audio signals are recorded in a first mode, in which voices are recorded for about 20 seconds per track. If the modes is note the first mode, it is determined in step 207 whether the audio signals are recorded in a second mode, in which voices are recorded for about 10 seconds per track. When it is determined to be second mode, the reference values N is changed to "2N" in step 208. If it is determined to not be the second mode, it is a third mode, in which voices are recorded for about 5 seconds per track. Thus, the reference value N is changed to "4N" in step 209.

Then, a counter M is set to "1" in step 210, and the voices are reproduced in step 211 and the following steps.

In step 211, one sector is reproduced, thereby causing the voices to be reproduced. Then, in step 212, it is determined whether the stop button 14 (FIG. 1) has been depressed. When the stop button 14 has been depressed, the process is forcibly ended under this condition. Conversely, when the stop button 14 has not been depressed, step 213 is executed. In step 213, it is determined whether the sector now being reproduced is the Type 3 pattern; i.e., the sector is the end of a series of the audio signals. If the sector is the Type 3 pattern, the process immediately returns to step 201, because the series of audio signals has been terminated. If the sector is not the Type 3 pattern, however, it is determined in step 214 whether the counter M has reached the reference value N. If the counter M has reached the reference value N, i.e., if a predetermined number of sectors have been reproduced, the process returns to step 201 and the heading of the next audio signals is started.

Conversely, when a predetermined number of sectors has not been reproduced and the counter M has not reached the reference value N, the counter M is incremented by "1" in step 215. Thereafter, it is determined in step 216 whether the sector now being reproduced is the Type 2 pattern, i.e., the audio signals recorded in the sector continue onto a sector of the other track. When the reproduced sector is not the Type 2 pattern, the process returns directly to step 211, but, when it is the Type 2 pattern, the magnetic head 21 is moved to the subsequent track in step 217, and the process returns to step 211.

Steps 211 through 217 are repeatedly executed, whereby audio signals recorded in a predetermined number of sectors are reproduced. If it is determined in step 213 that the sector now being reproduced is the Type 3 pattern, or it is determined in step 214 that a predetermined number of sectors have been reproduced, the process returns to step 201. The operations as described above are repeatedly executed, and thus, a next series of audio signals is reproduced.

As described above, in the second signal retrieval method, the amount of reproduction (or number of sector to be reproduced) is changed in accordance with the compression ratio when recording the audio signals. The smaller the compression ratio, the greater the number of sectors to be reproduced for heading. Namely, the reproduction time is constant (i.e., 5 seconds) regardless of the audio signal recording mode. Therefore, even though the mode is one in which voices are recorded for about 5 seconds per track and the compression ratio is small, the reproduction time is sufficiently prolonged that it becomes easy to recognize the voices. Thus, it is possible to accurately retrieve an appointed track. Furthermore, according to this second method, even though audio signals having different recording modes are mixed and exist in one video floppy disk, the number of sectors in accordance with each of the modes is always reproduced. Accordingly, it is possible to accurately retrieve an appointed track.

Figure 7:
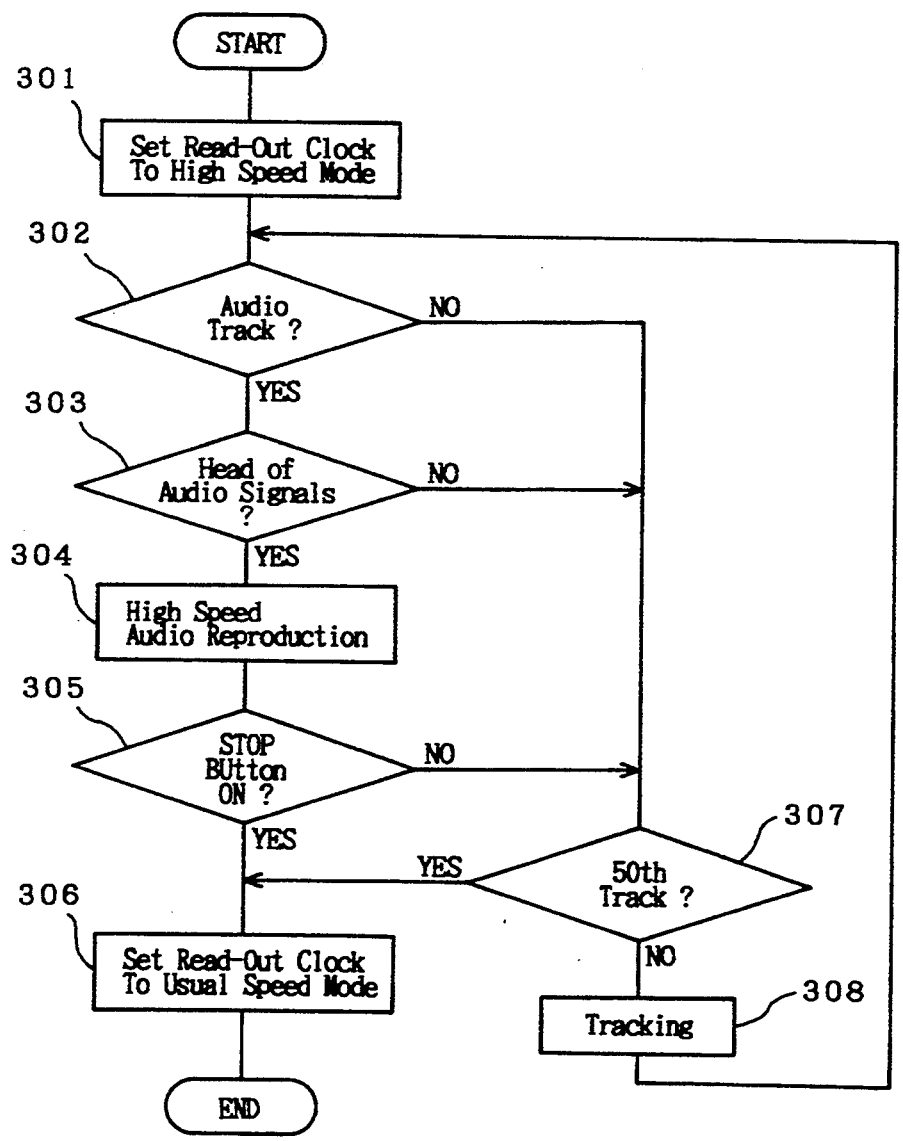
FIG. 7 is a flow chart showing a third method of retrieving audio signals.

FIG. 7 is a flow chart showing a third method of carrying out a retrieval of audio signals. This routine is started by depressing the audio retrieval button 13 (FIG. 1).

In step 301, a read-out clock is set to a high speed mode. This read-out clock is a pulse signal outputted at predetermined intervals to thereby control the timing of a read-out when reproducing audio signals recorded in the video floppy disk D, and is outputted by a clock generating routine (not shown). Namely, the cycle of the generation of the pulse signal is made short by an execution of step 301.

In step 302, it is determined whether the track to be currently reproduced is one in which audio signals are recorded. This is determined based on signals outputted by a synchronous signals separation circuit (not shown). When audio signals are recorded on the track, it is determined by reading a control code C1 (FIG. 4) in step 303, whether this is the head of a series of audio signals, as in step 104 of FIG. 5.

When the beginning of a series of audio signals is about to be reproduced, step 304 is executed and the audio signals are reproduced at a high speed in accordance with the read-out clock of the high speed mode set in step 301. Namely, in this method, a series of audio signals starting from the Type 1 pattern and ending at the Type 3 pattern (in FIG. 3, the audio signals starting from sector #0 of track 5 and ending at sector #0 of track 13) are all reproduced. The speed of this reproduction is larger than, for example, double, a usual reproducing speed. In other words, the expansion ratio of audio signals in this reproduction is smaller than the expansion ratio in a usual reproduction. If 5 second audio signals are recorded in the mode in which voices are recorded for about 5 seconds per track, all audio signals are reproduced in about 2.5 seconds.

When the high speed reproduction is ended, it is determined in step 305 whether the stop button 14 has been depressed. When the stop button 14 has been depressed, the read-out clock is set to a usual speed mode, i.e., a usual reproduction state, in step 306, and the process is ended.

Conversely, when it is determined in step 305 that the stop button 14 has not been depressed, it is determined in step 307 whether the track now being reproduced corresponds to the 50th track of the video floppy disk D, i.e., the innermost track of the recording tracks. The video floppy disk D is read from the outermost side to the innermost side thereof. Then, if a reproduction of the 50th track has ended, the read-out clock is set to the usual speed mode in step 306, and the process is ended. Conversely, if the reproduction of the 50th track has not ended, a tracking operation is carried out in step 308 and the magnetic head 21 is moved inward by one track, and the process then returns to step 302.

When it is determined in step 302 that the track about to be reproduced is not a track in which audio signals are recorded, or when it is determined in step 303 that the sector which has been read is not the head of a series of audio signals, step 307 is executed. Namely, if a reproduction of the 50th track has ended, the read-out clock is set to the usual speed mode and the process is ended. Conversely, if the reproduction of the 50th track has not ended, a track inward therefrom is reproduced.

As described above, according to the third signal retrieval method, since all of a series of the audio signals are reproduced at a high speed when retrieving the audio signals, all of the voices can be heard in a short time period. Thus, the retrieval time is shortened and the retrieval efficiency is greatly increased.

Figure 8:
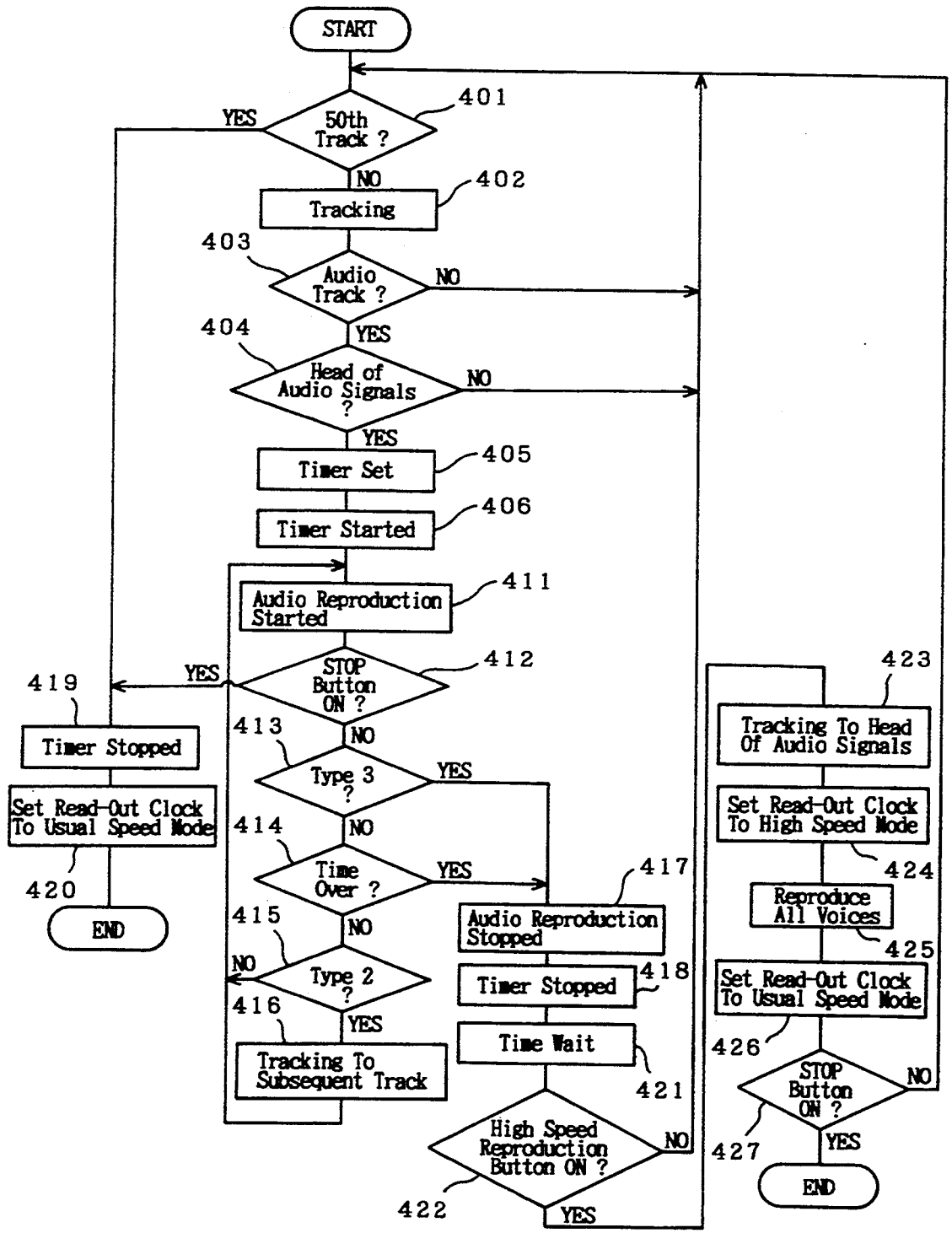
FIG. 8 is a flow chart showing a fourth method of retrieving audio signals.

FIG. 8 is a flow chart showing a fourth method of carrying out a retrieval of audio signals. This routine is started by depressing the voice retrieval button 13 (FIG. 1).

Since steps 401 through 406 of FIG. 8 are equivalent to steps 101 through 106 in FIG. 5, and steps 411 through 419 thereof are equivalent to steps 111 through 119 in FIG. 5, a description of these steps is omitted.

When it is determined in step 401 that the magnetic head 21 is located at the 50th track, the timer is stopped in step 419, and the read-out clock is set to a usual speed mode in step 420. Then, the process is ended. Note, the timer is stopped to prevent the process from ending under a condition in which the timer has been operated since step 406, to be described later.

Although step 411 through 416 are repeatedly executed to reproduce audio signals in some sectors, if it is determined in step 413 that the sector being reproduced is the Type 3 pattern, or it is determined in step 414 that a predetermined time has elapsed, the reproduction of the audio signals is stopped in step 417 and the timer is stopped in step 418.

Then, in step 421, the process waits for a fixed time (for example, three seconds), and it is determined in step 422 whether the high speed reproduction button 19 (FIG. 1) has been depressed. The high speed reproduction button 19 is depressed when the details of the audio signals are not clearly understood during a reproduction of the audio signals at steps 411 through 416. Thus, it is necessary to again reproduce the same audio signals at a high speed. Therefore, when the high speed reproduction button 19 is depressed during the waiting time in step 421, step 423 and the following steps are executed to carry out the high speed reproduction. Conversely, when the high speed reproduction button 19 is not depressed during the waiting time, the process returns to step 401.

In step 423, the magnetic head 21 is returned to the head of a series of the audio signals. This head sector is the same as that obtained in step 404. Thus, the same audio signals as reproduced in steps 411 through 416 are again reproduced.

In step 424, the read-out clock is set to the high speed mode, as in step 301 in the third method shown in FIG. 7. Then, in step 425, all of a series of the audio signals is reproduced at a higher speed than the usual reproduction speed. The read-out clock is reset to the usual speed mode in step 426. In step 427, it is determined whether the stop button 14 has been depressed. If it has been depressed, the process is immediately ended, but if it has not been depressed, the process returns to step 401 and each of the operations described above is again executed so that the subsequent audio signals are reproduced.

As described above, in the fourth signal retrieval method, during a retrieval of audio signals in which the audio signals are reproduced at the usual speed, if the same audio signals must again be reproduced, the second reproduction is carried out at a high speed. Namely, in the second reproduction, the audio signals are reproduced at a smaller expansion ratio than the expansion ratio used for the first reproduction. Therefore, for example, even though it is difficult to retrieve the audio signals because the time limit of the timer set in step 405 is too short, all of the audio signals are reproduced and the retrieval thereof is securely executed. Also, since all of the audio signals are reproduced at a high speed, the retrieval thereof is efficiently carried out in a short time.

Figure 9:
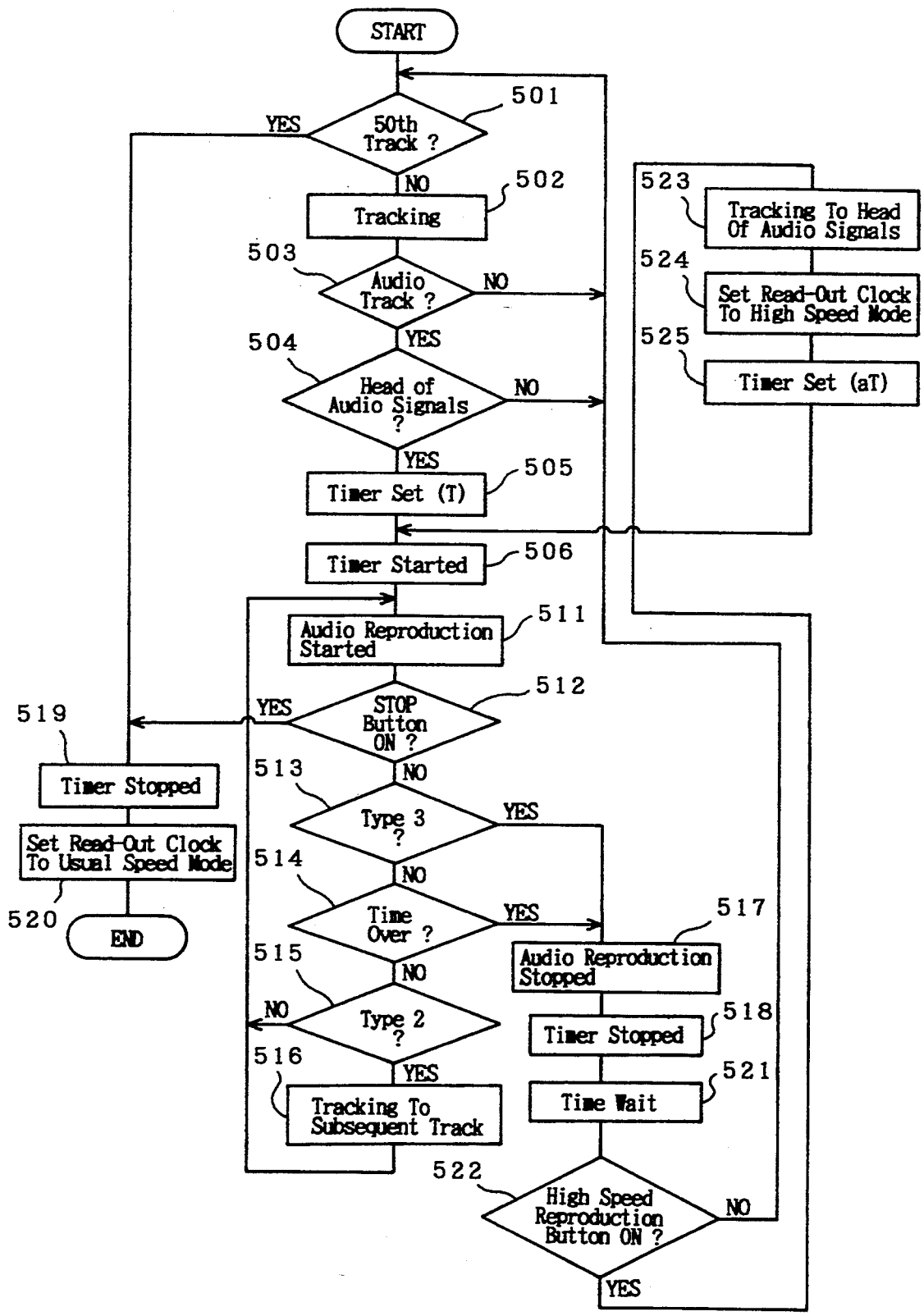
FIG. 9 is a flow chart showing a fifth method of retrieving audio signals.

FIG. 9 is a flow chart showing a fifth method of carrying out a retrieval of audio signals. This routine is started by depressing the voice retrieval button 13 (FIG. 1), as in the fourth signal retrieval method shown in FIG. 8.

Steps 501 through 506 of FIG. 9 are equivalent to steps 401 through 406 of FIG. 8, and steps 511 through 514 thereof are equivalent to steps 411 through 414 of FIG. 8. Thus, a description thereof is omitted.

In this method, when the high speed reproduction button 19 is depressed to reproduced audio signals, the read-out clock is set to the high speed mode in step 524. Then, in step 525, a time limit (aT) is set to the timer for a time limit (T) set in step 505. Note, "a" is a constant which satisfies:

$$a > (Fn/Ff)$$

when, it is assumed that the usual clock frequency is "Fn" and the high speed clock frequency is "Ff". For example, when $Fn/Ff = \frac{1}{2}$, "1" or "2" can be selected as "a". Namely, the time limit (aT) has a length such that, although all of the voices can not be reproduced in the time limit (aT) when reproducing a series of audio signals at a high speed, more audio signals are reproduced than those reproduced in a usual reproduction during the time (T). Note, if "a" is set to a large number, all of the audio signals can be reproduced.

The process then goes to step 506, and the timer is started to cause steps 511 through 516 to be repeatedly executed, whereby a series of audio signals is reproduced at a high speed.

When, during the high speed reproduction, it is determined in step 513 that a sector of the Type 3 pattern is read, or it is determined in step 514 that the time limit has elapsed, the process goes to step 517, the reproduction of voices is stopped, and the timer is stopped in step 518. Then, after the process has waited for a fixed period of time in step 522, it is determined in step 522 whether the high speed reproduction button 19 has been depressed again. If the button 19 has been depressed, the process again goes to step 523, and the high speed reproduction is again carried out. Conversely, if the button 19 has not been depressed, the process returns to step 501.

As described above, in the fifth signal retrieval method, all of a series of audio signals is not reproduced as in the method shown in FIG. 8. Rather, only a part of the audio signals is reproduced at a high speed. Therefore, the audio signals can be confirmed in a shorter time than in the fourth retrieval method shown in FIG. 8. Thus, the fifth retrieval method can bring a further increase of the retrieval efficiency, in comparison with the fourth method. Note, in a mode in which voices are recorded for about 5 seconds per track, for example, all of the audio signals can be reproduced.

Figure 10:
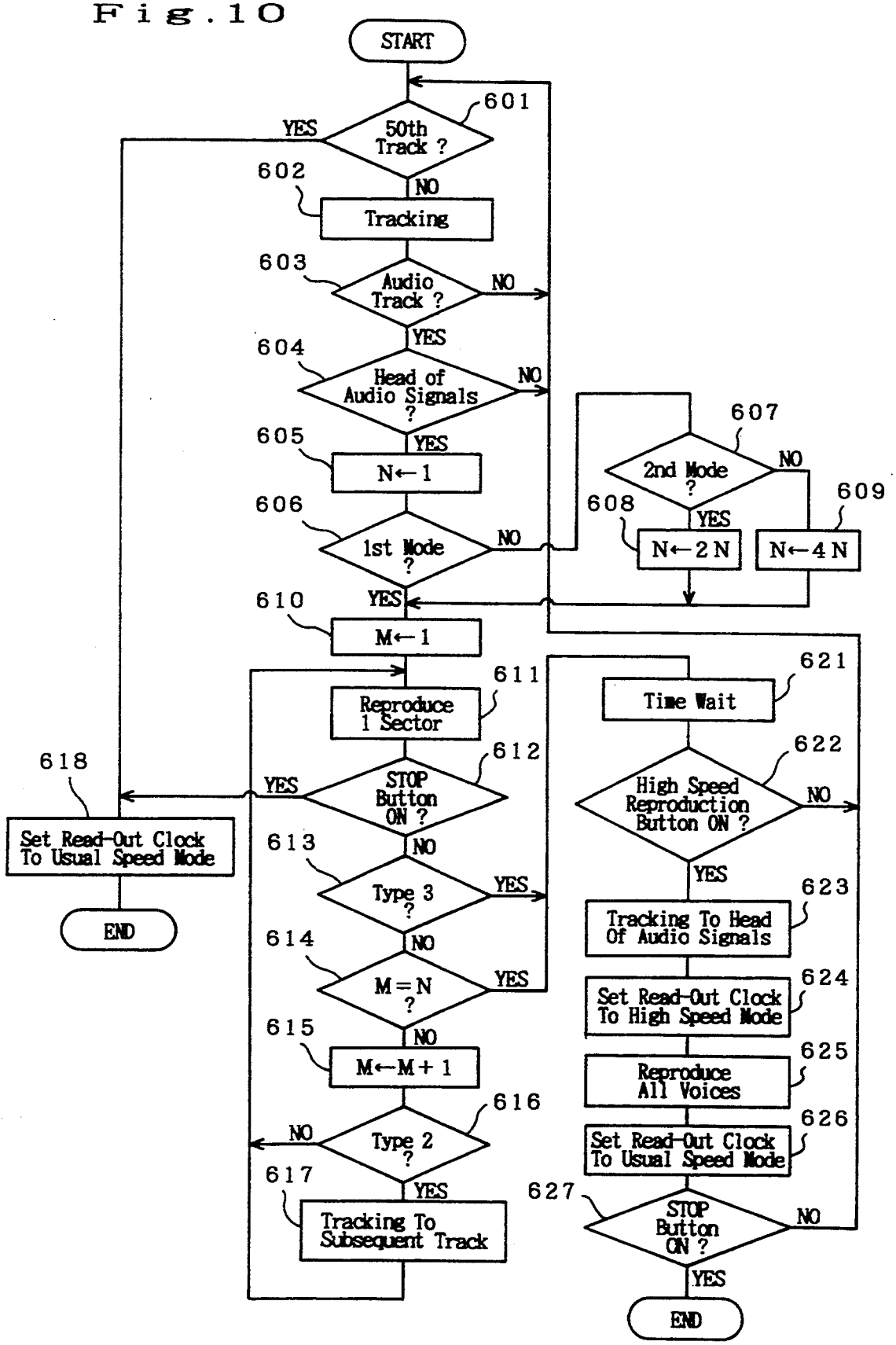
FIG. 10 is a flow chart showing a sixth method of retrieving audio signals.

FIG. 10 is a flow chart showing a sixth signal retrieval method for carrying out a retrieval of audio signals. This routine is started by depressing the voice retrieval button 13 (FIG. 1).

The operations in steps 601 through 610 of FIG. 10 are the same as those in steps 201 through 210 of FIG. 6. Therefore, a description thereof is omitted.

In step 611, when one sector is reproduced, the voices are reproduced. Then, in step 612, it is determined whether the stop button 14 has been depressed. If the button 14 has been depressed, the read-out clock is set to a usual speed mode in step 618, as in step 520 of FIG. 9, and the process is ended. Conversely, if the stop button 14 has not been depressed, step 613 is executed. Namely, it is determined whether the sector now being reproduced is the Type 3 pattern, i.e., the end of a series of the audio signals. If it is not the Type 3 pattern, it is determined in step 614 whether counter M has reached reference value N. If the counter M has not reached the reference value N, step 615 is executed and the counter M is incremented by "1". Thereafter, in step 616, it is determined whether the sector now being reproduced is the Type 2 pattern, i.e., the audio signals are continued to a sector of the other track. If it is not the Type 2 pattern, the process returns to step 611. Conversely, if the sector is the Type 2 pattern, the magnetic head 21 is moved to a subsequent track by a tracking operation in step 617, and the process then returns to step 611.

Steps 611 through 617 are repeatedly executed to reproduce the audio signals in a predetermined number of sectors. When it is determined in step 613 that the sector now being reproduced is the Type 3 pattern, or it is determined in step 614 that the reproduction of a predetermined number of sectors has ended, step 621 and the following steps are executed and a high speed reproduction is executed if necessary. Steps 621 through 627 are equivalent to steps 421 through 427 of FIG. 8, and therefore, a description thereof is omitted.

As described above, in the sixth signal retrieval method, the amount of reproduction of the audio signals can be changed in accordance with the compression ratio used when recording the audio signals. Therefore, the smaller the compression ratio, the greater the number of sectors to be reproduced for a heading. Further, when the audio signals are reproduced at a high speed, all of a series of audio signals are reproduced. Therefore, even though voices are recorded in a mode having a small compression ratio, the reproduction time at a high speed is sufficient. Thus, it is easy to recognize the voices.

Figure 11:
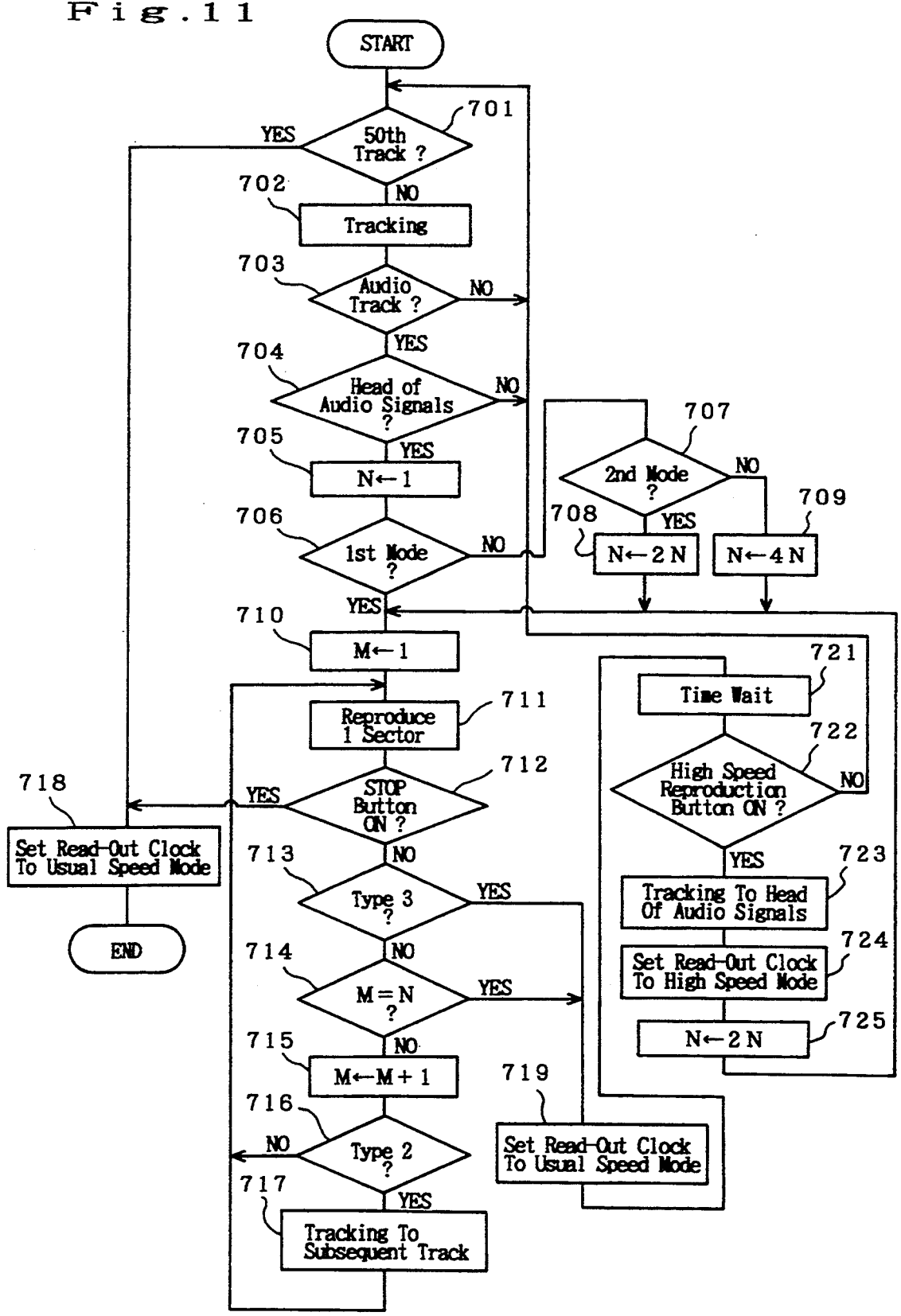
FIG. 11 is a flow chart showing a seventh method of retrieving audio signals.

FIG. 11 is a flow chart showing a seventh method of carrying out a retrieval of audio signals. This routine is started by depressing the voice retrieval button 13 (FIG. 1).

The operations in step 701 through 718 of FIG. 11 are equivalent to those in steps 601 through 618 of FIG. 10. Therefore, a description thereof is omitted.

When it is determined in step 713 that the sector now being reproduced is the Type 3 pattern, or it is determined in step 714 that the reproduction of a predetermined number of sectors has ended, the read-out clock is set to a usual speed mode in step 719. Then, step 721 and the following steps are executed, whereby a high speed reproduction is executed if necessary.

In steps 721 through 724, the operations which are equivalent to those in steps 621 through 624 of FIG. 10 are carried out. Then, in step 725, reference value N, indicating the number of sectors to be reproduced, is set to twice the value that was previously set. Thereafter, the process returns to step 710, where counter M is set to "1". Step 711 and the following steps are then executed, to thereby cause the audio signals to be reproduced again.

In this case, since the read-out clock is set to a high speed mode in step 724, the audio signals are reproduced at a high speed. Since the reference value N is doubled in step 725, it is possible to reproduce twice as many sectors in comparison with the number reproduced in the initial reproduction.

In the seventh retrieval method, all of a series of the audio signal is not reproduced, as in the sixth method shown in FIG. 10. Rather, only a part of the audio signal is reproduced at a high speed. Therefore, it is possible to confirm the audio signal in a shorter time than the sixth method shown in FIG. 10. Thus, the retrieval efficiency is improved in comparison with that of the sixth method. Note, in some recording modes, all of the audio signal can be reproduced. For example, in the second mode in which voices are recorded for about 10 seconds per track, the number of sectors (two) corresponding to 5 second audio signals is set in step 708 and the number of sectors (four) is set in step 725. Therefore, all of the audio signal is reproduced.

Note, although a video floppy disk is used as the recording medium in the first through seventh retrieval methods described above, the present invention is not restricted to the use of a video floppy disk, but can be applied to a device in which a magnetic tape or a magnetic drum, etc., are used as the recording medium.

Although the embodiments of the present invention have been described herein with reference to the accompanying drawings, obviously many modifications and changes may be made by those skilled in the art without departing from the scope of the invention.

The present disclosure relates to subject matters contained in Japanese patent application Nos. HEI 2-264284 and HEI 2-264285 (both filed on Oct. 1, 1990), which are expressly incorporated herein by reference in their entirety.

I claim:

1. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said identified beginning portion, in which a sufficient amount of audio signals are reproduced so as to allow recognizing of a recorded signal, said device comprising:

an adjuster that adjusts a recording mode of said audio signals;

a determiner that determines said recording mode of said audio signals detected by said detector, said audio signals being recorded to said recording medium with a compression ratio dependent on said adjusted recording mode, an amount of audio signals to be reproduced being adjusted, based on said compression ratio, so that a smaller said compression ratio, a larger said amount of audio signals that are reproduced; and means for reproducing said audio signals two times, a first reproduction being performed at a real-time speed and a second reproduction being performed at a speed higher than said real-time speed.

2. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said identified beginning portion, in which a sufficient amount of audio signals are reproduced so as to allow recognizing of a recorded signal, said device comprising:

an adjuster that adjusts a recording mode of said audio signals;

a determiner that determines said recording mode of said audio signals detected by said detector, said audio signals being recorded to said recording medium with a compression ratio dependent on said adjusted recording mode, an amount of audio signals to be reproduced being adjusted, based on said compression ratio, so that a smaller said compression ratio, a larger said amount of audio signals that are reproduced; and means for reproducing said audio signals two times, a first reproduction being performed at a constant speed and a second reproduction being performed in which only a portion of said audio signals are reproduced with a speed that is greater than said constant speed.

3. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said identified beginning portion, in which a sufficient amount of audio signals are reproduced so as to allow recognizing of a recorded signal, said device comprising:

an adjuster that adjusts a recording mode of said audio signals;

a determiner that determines said recording mode of said audio signals detected by said detector, said audio signals being recorded to said recording medium with a compression ratio dependent on said adjusted recording mode, an amount of audio signals to be reproduced being adjusted, based on said compression ratio, so that a smaller said compression ratio, a larger said amount of audio signals that are reproduced; and means for reproducing said audio signals two times, an amount of said audio signals being reproduced during a first reproduction varying in accordance with said compression ratio, while the whole audio signals are reproduced at a speed that is higher than a reproduction speed of said first reproduction during a second reproduction.

4. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said identified beginning portion, in which a sufficient amount of audio signals are reproduced so as to allow recognizing of a recorded signal, said device comprising:

an adjuster that adjusts a recording mode of said audio signals;

a determiner that determines said recording mode of said audio signals detected by said detector, said audio signals being recorded to said recording medium with a compression ratio dependent on said adjusted recording mode, an amount of audio signals to be reproduced being adjusted, based on said compression ratio, so that a smaller said compression ratio, a larger said amount of audio signals that are reproduced; and means for reproducing said audio signals two times, an amount of said audio signals being reproduced during a first reproduction varying in accordance with said compression ratio, while only a portion of said audio signals are reproduced during a second reproduction, said portion of said audio signals being reproduced at a speed that is higher than a reproduction speed of said first reproduction.

5. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said beginning portion, an amount of said audio signals being reproduced with an expansion ration smaller than a normal expansion ratio used for a normal reproduction of said audio signals, said reproducing device comprising:

a selector that selects a recording mode in which said audio signals are recorded to said recording medium; and a determiner that determines said recording mode selected by said selector, said audio signals being recorded to said recording medium with a compression ratio that varies in accordance with a selected recording mode, said reproducing device reproducing said audio signals with a first expansion ratio during a first reproduction and then reproducing said audio signals with a second expansion ratio during a second reproduction, wherein said first reproduction is performed at a real-time speed while said second reproduction is performed at a speed that is greater than said real-time speed.

6. The device of claim 5, wherein said second reproduction reproduces only a portion of said audio signals.

7. A device for reproducing audio signals recorded to a recording medium, said reproducing device having a detector that detects said audio signals, a beginning audio signal identifier that identifies a beginning portion of a series of audio signals, and a reproducer that reproduces said audio signals starting from said beginning portion, an amount of said audio signals being reproduced with an expansion ration smaller than a normal expansion ratio used for a normal reproduction of said audio signals, said reproducing device comprising:

a selector that selects a recording mode in which said audio signals are recorded to said recording medium; and a determiner that determines said recording mode selected by said selector, said audio signals being recorded to said recording medium with a compression ratio that varies in accordance with a selected recording mode, said reproducing device reproducing said audio signals with a first expansion ratio during a first reproduction and then reproducing said audio signals with a second expansion ratio during a second reproduction, wherein said first reproduction reproduced an amount of said audio signals that varies in accordance with a selected compression ratio while said second reproduction reproduces said audio signal at a speed that is greater than a real-time speed.

8. The device of claim 7, wherein said second reproduction reproduces only a portion of said audio signals.

* * * * *

UNITED STATES PATENT AND TRADEMARK OFFICE
CERTIFICATE OF CORRECTION

PATENT NO. : 5,406,423
DATED : April 11, 1995
INVENTOR(S) : Koichi SATO

It is certified that error appears in the above-indentified patent and that said Letters Patent is hereby corrected as shown below:

Title page, section [57], "ABSTRACT", lines 10-11, delete "compression ratio that is used, and the audio signals may be".

Title page, section [57], "ABSTRACT", line 14, before "reproduced" insert ---compression ratio that is used, and the audio signals may be---.

Signed and Sealed this

Eighth Day of April, 1997

Attest:

BRUCE LEHMAN

Attesting Officer

Commissioner of Patents and Trademarks